INVENTOR.
Benjamin H. Thurman
BY
Bacon & Thomas
ATTORNEYS

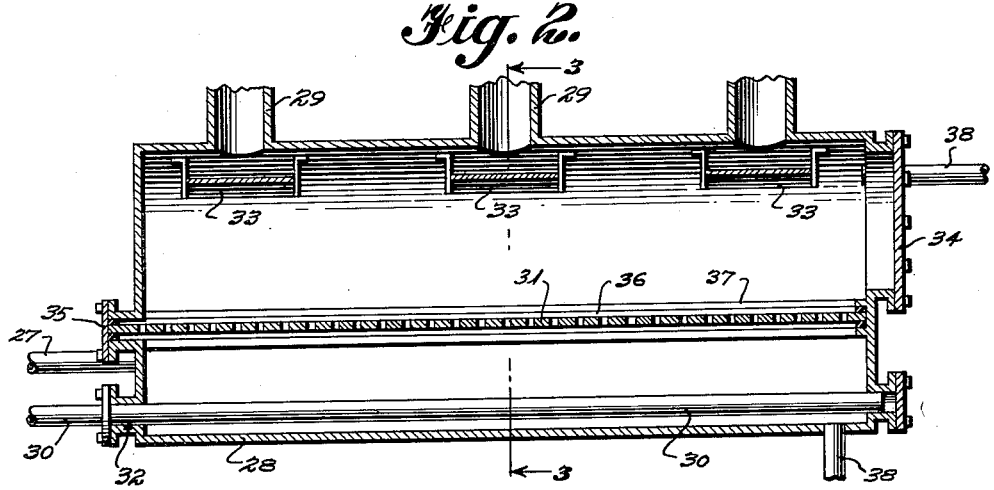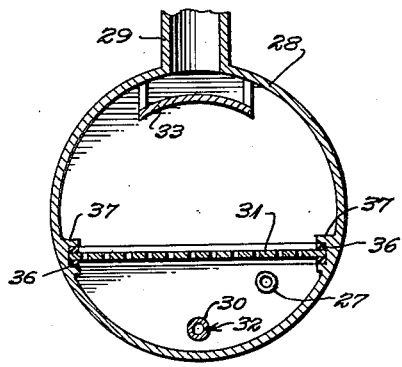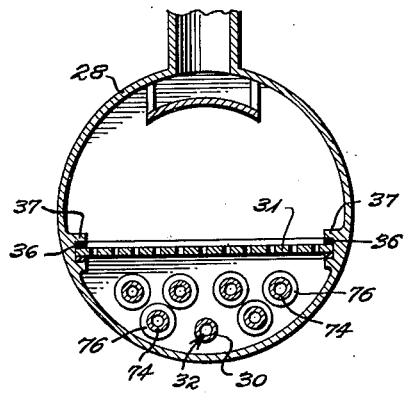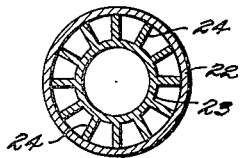

Patented Dec. 9, 1952

2,621,197

UNITED STATES PATENT OFFICE 2,621,197

PURIFICATION OF GLYCERIDE OIL

Benjamin H. Thurman, New York, N. Y., assignor to Kraft Foods Company, Chicago, Ill., a corporation of Delaware Application July 5, 1949, Serial No. 103,059

7 Claims. (Cl. 260—428)

This invention relates to the purification of oil, and more particularly, to a process for deodorizing edible glyceride oils to produce improved oils and recovering from the oil, after vaporization and condensation, a concentrate of valuable by-products. The invention has particular utility for the treatment of highly unsaturated, non-conjugated glyceride oils of the reverting type, such as soyabean oil, since it produces edible oils which are stable against both rancidity and reversion and at the same time recovers from the oil the valuable by-products referred to above.

In my copending application, Serial No. 57,114, filed October 28, 1948, I have disclosed a process and apparatus for deodorizing oils of the type just discussed and recovering valuable by-products therefrom in which the oil is deodorized in a plurality of stages. In the preferred operation of said application, the oil is steam treated under vacuum conditions at a temperature in the range of approximately 435° to 440° F. in a first low temperature stage. It is then further steam treated under vacuum conditions in additional stages at progressively increased temperatures, reaching a temperature in the range of 500° to 600° F. in the high temperature stage. The treating steam is bubbled through shallow baths of the oil in each stage and its escape from the oil is baffled to produce a mixing and separating action between the oil and steam. The heating of the oil between stages or in the stages themselves is carefully controlled to prevent any local overheating of the oil. The oil is continuously flowed through such stages and upon removal from the final high temperature stage is then treated in a plurality of similar stages at progressively lower temperatures with steam under high vacuum conditions. In such process the oil is subjected to substantially higher temperatures in the high temperature stage than had been found possible in prior deodorizing operations. The time of treatment in the high temperature stage is, however, held to such a short period of time, for example 15 to 30 minutes, that the glycerides of the oil itself are not damaged but the materials causing reversion are removed or modified in the process. A bland oil, stable against both reversion and rancidity is produced, and in addition, the high temperature and vacuum as well as the effective contact of steam with the oil enables substantial amounts of valuable by-products to be vaporized from the oil and condensed as a concentrate.

In accordance with the present invention I have found that the oil being deodorized may have its temperature raised immediately to the high temperatures discussed above and then subjected to steam treatment in a shallow bath under high vacuum conditions in a deodorizing stage if steam treatment is continued at progressively lower temperatures after the high temperature stage. By carefully controlling the conditions during heating of the oil so as not to produce local overheating thereof, and also by treating the oil in stages at progessively lower temperatures with steam and under high vacuum conditions, a bland oil of high quality stable against both reversion and rancidity may be produced while at the same time vaporized impurities are recovered as a valuable by-product concentrate. The process in the present invention results in a considerable simplification of the apparatus employed as well as a considerable saving in the amount of steam required to treat the oil. Furthermore, the oil is subjected to high temperatures, i. e., temperatures above approximately 400° F. for a substantially lesser time than is the case in the process of my aforesaid copending application. The treatment in stages at progressively rising temperatures as contemplated in the prior process of my said copending application has certain advantages in that heat-sensitive materials are removed or modified at the lower temperatures in the deodorizing stages before they are subjected to high temperatures, but the lesser time at which the oil is subjected to the high temperatures in the present process is likewise an advantage such that oils produced in the present process are equivalent to or better than the oils produced in the process of my said copending application, and the by-products are similar in quality and amount to those produced by the process of said copending application.

The present process also has utility for the treatment of edible oils which are commercially considered to be relatively non-reverting, such as cottonseed, corn oil, peanut oil, sunflower seed oil and sesame seed oil. It makes possible the rapid and continuous deodorization of such oils at less expense than conventional batch procedures. Also, the valuable by-products recovered from the oil make the process profitable even though such oils may be satisfactorily deodorized by conventional prior processes. Certain glyceride oils which are highly conjugated and which rapidly polymerize, for example, tung oil, are not suitable for treatment by the present process, but such oils are not classed as edible oils. In general, the present process can be advantageously employed for the treatment of substantially all glyceride oils recognized as edible oils, including animal and fish oils, either by reason of the improved oil produced, or the valuable products separated from the oil and recovered, or both.

The present invention is primarily concerned with, although it is not limited to, the treatment of glyceride oils which have been previously refined, for example, by alkali refining, to remove most of the impurities contained therein. After alkali refining, such oils contain only a very small amount of residual impurities, usually not greater than about 1.0 to 1.3%, but these residual impurities include most, if not all, of the materials which produce the characteristic odor and taste of a particular oil. Most of the residual impurities are materials classifiable as unsaponifiables, and there is usually a small amount of free fatty acids. As an example, the residual impurities in soyabean oil include coloring matter, tocopherols and sterols, as well as various other complex compounds many of which have not been identified.

Most of the coloring matter can be removed from even highly colored glyceride oils by treatment with an absorbent such as fuller's earth, activated clay, or activated charcoal. Even an extremely dark oil, such as cottonseed oil may usually be brought to a light yellow color by this procedure. Treatment of oil with the conventional oil adsorbents noted above does not, however, remove the materials which impart the characteristic taste and odor to a particular oil, and it is for this reason that the deodorization of glyceride oils which are to be used for food purposes has been considered essential. Moreover, even after deodorization by the previously known process, the deodorized oil may later develop objectionable odor or flavor, or both, in accordance with the phenomenon which the industry commonly designates as "reversion."

It is to be noted that the term reversion as employed in the edible oil art is not strictly accurate. This term connotates a return after deodorization to the original flavor of the oil introduced into the deodorizing process. The flavor which does develop in a reverting oil upon standing after deodorization is ordinarily not identical with the flavor of the oil introduced into the deodorizing process, and the term reversion is loosely used to mean the development after a time delay of any "off flavor" other than a rancid flavor. A reverting oil is, therefore, any oil which can be initially deodorized to a bland oil but which develops an off flavor other than a rancid flavor upon storage either as a body of oil or as part of an edible product. The reason for the reversion of soya bean and other glyceride oils is not wholly understood.

Soya bean oil presents a particularly difficult problem with respect to the development of objectionable odor and taste by the reversion phenomenon. In fact, the lack of stability of soya bean oil, particularly with respect to reversion, after it has been subjected to prior deodorizing processes, has seriously limited its use in human foods. The process of my copending application, supra, and the present process are believed to be the first to consistently effect the deodorization and stabilization of soya bean oil so as to make it useful as a high quality human food. The present invention is, therefore, primarily directed to the treatment of soya bean oil, although any of the edible glyceride oils, including animal, fish and vegetable oils, as well as hydrogenated oils of the types mentioned, may be advantageously treated by the process of the present invention.

As previously indicated, the process of the present invention does not require that the glyceride oil being treated shall be an alkali-refined oil. It is necessary merely that the oil be sufficiently free from gums so that heat-precipitated gums do not deposit in or clog the deodorizing system. Thus, degummed oils as well as oils which are initially free from gums, such as certain types of solvent extracted oils or solvent treated oils, may be subjected to the treatment of the present invention without previous alkali refining.

One of the best known of the prior processes for deodorizing refined soya bean oil, and most other edible oils, has conventionally comprised the heating of a large batch of the oil, for example 30,000 lbs., to a relatively high temperature in a vertically extending still. Temperatures as high as 400° F. and even in extreme cases, with small batches of difficult oils, temperatures as 475° F., have been employed in such processes. Oil at ambient temperatures or oil heated to moderately elevated temperatures, has been introduced into the still so as to occupy approximately one-half of the volume thereof. A vacuum, within the range of from about 28 to 29 inches of mercury, has been produced in the space above the oil and the oil heated as rapidly as possible to the temperature desired by means of heating coils in the still or heating jackets around the still. Steam has been bubbled upwardly through this deep body of oil, from the lower portion thereof, to assist in vaporizing the odor and taste bodies and the oil has been held at the high temperatures during treatment with steam and under vacuum for periods of time ranging from four to ten hours, depending upon the nature of the oil and the temperatures employed. A deep body of oil, such as 8 to 10 feet, has been employed primarily to prevent the violent splashing and surging of the oil which ordinarily takes place when steam is released into a shallow body of heated glyceride oil under vacuum conditions. Under these conditions vaporization of impurities is probably effected in the upper few inches only of the body of the oil, because of the increased pressure in the lower portions thereof, due to the hydrostatic head of the oil, and an extended time of treatment at high temperatures has been required to remove volatile impurities.

With most oils, it has been possible to initially produce a bland, substantially odorless and tasteless oil in such batch processes without serious modification of the glycerides of the oil. There has been, however, a considerable amount of soya bean oil which has not been capable of even initial deodorization by the prior batch process above described. With such oils, it has been found that the temperature and time of treatment necessary to remove the odor and taste bodies from the oil will seriously damage the oil before the odor and taste producing materials have been adequately removed. Thus, in treating these oils, the operators have, in general, limited the time of treatment, and the temperature of the oil during treatment, to prevent oil damage, but in so operating, they have been unable to satisfactorily deodorize the oils. In such instances the resulting oils are not marketable as edible oils and constitute a serious loss to the oil refiner.

From the above, it is not to be understood that all soya bean oils cannot be initially converted into a bland oil by prior processes. Many soya bean oils are susceptible to batch deodorizing in the sense that the oil withdrawn from the deodorizer is substantially odorless and tasteless. Nevertheless, such oils invariably exhibit the reversion phenomenon and develop an undesirable odor and taste subsequent to the deodorization process.

As noted above, the process of the present invention makes possible the deodorization of soya bean and other glyceride oils so as to produce a bland substantially odorless and tasteless oil which is substantially free from any tendency to revert at ordinary temperatures, and which has greatly increased stability against reversion at elevated temperatures. In accordance with the present process, the oil is carefully heated to a temperature much higher than that employed in conventional prior processes. It is then introduced into a high temperature deodorizing stage in which the oil is maintained in a shallow stream or pool while in intimate contact with steam and while being subjected to a high vacuum. After passing through such high temperature deodorizing stage, the temperature of the oil is rapidly reduced conveniently by stage cooling to a predetermined temperature, the oil being treated with steam under vacuum conditions at progressively lower temperatures.

Contrary to applicant's expectation, the most critical portion of the heating cycle has been found to be the initial portion thereof, i. e., from ambient temperatures up to about 350° to 400° F. At low temperatures the oils are quite viscous and tend to form stationary or nearly stationary films on heated surfaces with which they are brought in contact. Even in carefully designed heat-exchangers employing smooth heating surfaces of large area and a low differential between the heating medium and the oil, such films remain in contact with the heated surfaces for sufficient length of time to damage portions thereof. Any residual gums present, no matter how small in amount, collect in such films and may even build up considerable thicknesses to at least partially clog heaters for heating oil in a continuously flowing stream. The deposited material reduces heat exchange efficiency and eventually is burned or scorched, or otherwise deleteriously heat-modified. Portions of this material eventually break away from the heated surfaces unless the plant is frequently shut down and the critical heaters thoroughly cleaned. The present invention contemplates an improved initial heating operation for overcoming these difficulties. The final or high temperature portion of the heating operation is also critical and care must be exercised not to heat any portion of the oil therein materially above the average temperature of the oil in that particular part of the process.

By the present invention, the total time of heat treatment of the oil at elevated temperatures, for example, temperatures above 400° F., can be very much shortened over prior processes including the process of my said copending application. The time of treatment at the high temperature may be made sufficiently short that the oil itself is not deleteriously modified despite the high temperatures employed. Even oils which have been unsuccessfully deodorized in prior conventional processes or which are not susceptible to such deodorization can be successfully treated by the present process so long as the glycerides constituting the main bulk of the oil have not been modified or damaged by prior treatment at too high a temperature or for too long a period of time at such high temperatures.

Apparently the process of the present invention accomplishes the desired result of producing a stable, non-reverting deodorized oil by a number of inter-related although differing changes in the oil under treatment. While it is generally assumed that the objectionable taste and odor, which develop during the reversion of deodorized glyceride oils, results from a chemical change in one of the so-called impurities, i. e., from a chemical change in one of the materials from the group including the sterols, tocopherols and other of the unsaponifiables, it is possible that some of this taste and odor may result from a change in some of the more complex glycerides constituting a part of the main bulk of the oil. The steam distillation process of the present invention may accomplish the desired results by straight vaporization of the materials which would otherwise cause undesirable odor and taste, by possible cracking and vaporization of such materials or by polymerization of various of these materials. Whether all three occur in the treatment of any given oil or whether other action takes place, is not fully understood. The pressures and temperatures used in the process are such that direct vaporization, cracking and subsequent vaporization or polymerization of the unwanted materials can occur and if one or more of these is necessary to remove or to modify the odor and taste producing materials causing reversion, the capability is present in the process.

The success of the present process appears to be largely due to the manner in which the oil is treated after having been passed through the high temperature deodorization operation. Apparently some cracking of small portions of the glycerides or other materials into volatile products takes place during the high temperature treatment of the oil and these cause an unpleasant odor and taste to be developed in the oil unless treatment with steam under vacuum conditions is continued at progressively decreased temperatures until the temperature of the oil is reduced to below approximately 325° to 350° F. Thus by cooling the highly heated oil under vacuum conditions in intimate contact with steam or by cooling the oil in stages by passing the oil alternately through cooling and steam treating chambers maintained under high vacuum conditions, the volatile materials produced by the high temperature treatment are removed substantially as fast as they are formed. For example, glyceride oils heated to 500°–600° F. can be quickly cooled in the absence of steam to about 400–450° F., subjected to effective steam distillation under vacuum conditions, again quickly cooled in the absence of steam and again given a steam distillation treatment, etc. The first steam distillation treatment should not be substantially below 400° F. and the last steam distillation treatment should not be above approximately 325–350° F. and should preferably be at a somewhat lower temperature.

The odor and taste due to the cracking or other action mentioned above is rubbery in nature and may be called a "cooked" or hot oil flavor. It increases rapidly with the time during which the oil is held at elevated temperatures when out of intimate contact with steam. Even a few seconds time at temperatures in the neighborhood of 550° F., or higher while the oil is flowing through a pipe to a cooler or the short delay in even a flash cooler before the oil temperature drops will cause an appreciable off flavor to be developed and such flavor will develop in slightly greater periods of time at 500° F. However, if the oil is cooled from the final temperature reached in the last deodorizing stage to a temperature below approximately 350° F., in accordance with either of the procedures discussed above, the volatile materials causing the unpleasant odor and taste are withdrawn from the oil substantially as soon as they are formed. Even if the oil has been cooled to a relatively low temperature with no steam and vacuum treatment so that the cooked flavor has developed, it can be again reheated to a temperature between 400° and 450° F. and subjected to one of the steam and vacuum treatments discussed in the preceding paragraphs.

The reversion phenomenon is also encountered in connection with hydrogenated or hardened oils. In general, hydrogenated oils, when they are removed from the hydrogenating apparatus, have an odor and taste which is similar to the odor of a snuffed tallow candle, and in order to remove this odor and taste, so as to permit the use of the oil for edible purposes, all hydrogenated oils, subsequent to the hydrogenation operation, have been subjected to a deodorization process. Conventionally, a batch deodorizing process as described above, has been used. The oil after removal from the deodorizer is usually substantially odorless and tasteless but upon standing an undesirable odor and taste may again develop, i. e., the oil reverts. An undesirable odor and taste may also develop when the oil is heated to high temperatures, for example, temperatures of the order employed in frying or baking, but all soyabean and many other hydrogenated oils deodorized by prior processes revert at much lower temperatures.

By subjecting glyceride oils which are to be subsequently hydrogenated to the high temperature deodorizing process of the present invention the oils are so conditioned as to nullify the capabilities of the reversion producing materials to cause objectionable odor and taste in the oil after hydrogenation. It is still necessary to deodorize the oil after the hydrogenation treatment following deodorization by the present process in order to remove the flavor developed during hydrogenation but this deodorization may be a relatively mild treatment, for example, in the conventional batch process although continuous deodorization processes may be employed. In fact the oil may be removed from the high temperature stage of the present invention and cooled in the absence of steam while being kept out of contact with the atmosphere to hydrogenating temperature, i. e., a temperature of 160° F. or below and then subjected to hydrogenation. After hydrogenation the oil may then again be heated to temperatures in the neighborhood of 400–450° F. and given a steam treatment under high vacuum conditions, for example, the stage cooling treatment of the present invention.

In addition to producing a highly stable deodorized oil, the present process removes substantial amounts of impurities from the oil by vaporization of these materials and recovers these materials as a valuable by-product of the process. The vaporized materials are condensed in the vacuum system as an aid in maintaining the high vacuum contemplated in the process and are easily recovered as a concentrate containing large proportions of fat-soluble vitamins, as valuable sterols and analogous compounds. The recovered concentrate forms a marketable product as a valuable source of vitamins, sterols, etc.

It is therefore an object of the present invention to provide an improved process of deodorizing oil by which soyabean and other reverting glyceride oils can be converted into a substantially odorless and tasteless food product which is stable against reversion and which has its physical properties substantially unmodified.

Another object of the invention is to provide an improved deodorizing process in which an edible oil is brought into intimate contact with steam under high vacuum conditions at a high temperature, followed by treatment with steam under high vacuum at progressively decreasing temperatures.

A further object of the invention is to provide an improved high temperature deodorizing treatment for edible oils in which a stable bland oil is produced and substantial amounts of valuable by-products are recovered.

Other objects and advantages of the invention will appear in the following description of preferred embodiments thereof given in connection with the attached drawings, in which:

Fig. 2 is a somewhat diagrammatic vertical section through a steam treating and vaporizing chamber suitable for employment in the various stages of the process of Fig. 1;

Fig. 3 is a vertical section through the steam treatment and deodorizing chamber taken on the line 3—3 of Fig. 2;

Fig. 4 is a vertical cross-section through a preferred heat exchanger employed to heat the oil in the process of Fig. 1;

Fig. 5 is a view similar to Fig. 3 showing a modified steam treating and vaporizing chamber particularly useful for initial treating of the oil; and Fig. 6 is a fragmentary elevation of a finned heating tube of the chamber of Fig. 5.

Figure 1:
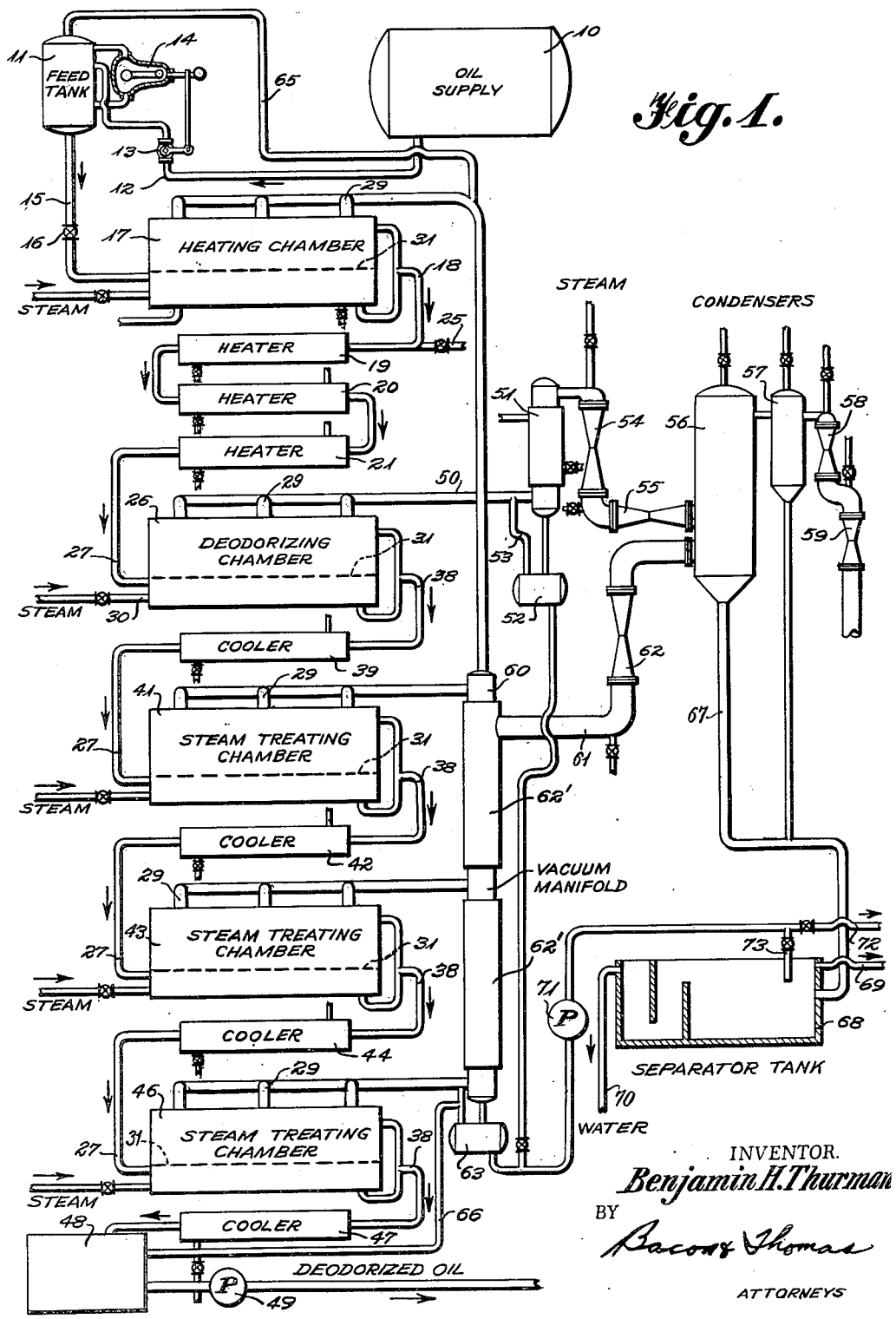
Fig. 1 is a schematic diagram of an apparatus for carrying out a continuous deodorizing process in accordance with the present invention.

Referring more particularly to the drawings, and particularly to Fig. 1, the oil to be deodorized may be withdrawn from a source of supply shown as a tank 10 by the vacuum maintained in the system, as later described, and delivered into a constant level deaerating tank 11 through a pipe 12 provided with a valve 13 actuated by a float in a float chamber 14 connected to the tank 11 so as to maintain a constant level of oil in the tank 11. The oil may flow by gravity through the remainder of the system although it will be understood that suitable pumps may be employed if the arrangement of the apparatus requires elevation of the oil to a higher level in any portion thereof. The oil may leave the tank 11 through a pipe 15 provided with a regulating valve 16 and may enter and flow through a heating chamber 17, later described in more detail, wherein the oil is initially heated under vacuum conditions while being agitated by steam.

The oil may leave the heating chamber 17 by overflowing through a pipe 18 connected to both the upper and lower portions of the chamber and flow through a plurality of heaters 19, 20 and 21 in series. A plurality of heaters is preferred instead of a single large heater, so that the application of heat to the oil may be carefully controlled, particularly in the last portion of the heating operation, for example, in the heat exchanger 21 in order to avoid any increase in temperature in any portion of the oil substantially above the average temperature of the oil therein. Thus, controlled amounts of heating medium of controlled temperature may be passed through the various heat exchangers. Ordinarily, the heat exchange medium will be passed through the heat exchangers 19, 20 and 21 in series countercurrent to the flow of oil, but it will be understood that additions of heating medium of proper temperature or withdrawals of portions of the heating medium from the heating system between heat exchangers may be made in order to more closely control the heating effect in each heat exchanger.

The preferred type of heat exchanger which is employed, particularly in the last heater 21, is shown in Fig. 4, which is a fragmentary section through one of the passages of a heat exchanger. The oil to be heated is preferably passed between an outer 22 and an inner tube 23, the heating medium such as steam or heated oil being passed through the inner tube. The inner tube 23 is preferably provided with a plurality of longitudinally extending fins 24 so as to provide an extremely large heating area in contact with the oil being heated. Furthermore, sufficient length of finned tube heating elements are preferably provided in each heat exchanger to furnish several times the heating area usually considered necessary for adequate heat exchange. The type of heat exchanger illustrated, or other suitable types providing an extremely large heating area in conjunction with the use of a heating medium which has a relatively low difference in temperature with respect to the oil in any cross-section of the heat exchanger enables the oil to be rapidly heated without overheating any portion thereof. Thus the heating medium entering any of the heaters 19 to 21 will preferably have a temperature which at no time is greater than 100° F. above the temperature of the oil being discharged from the heater, although in some instances a somewhat higher temperature differential is permissible in the lower temperature stages.

If desired the oil in the heaters may be kept in contact with steam by introducing a small amount of steam into the stream of oil entering the heater 19, for example, through the line indicated at 25. The steam employed may be of the same character as that introduced into the deodorizing and steam treating chambers, as discussed in detail below, and the amount of steam introduced into the oil entering the heaters will ordinarily be a small fraction of that introduced into each chamber. The steam introduced into the oil passing through the heater is released in the deodorizing chamber, as later described, and assists in separating vapors from the oil. In general, the amount of steam thus introduced into the heater may be approximately 0.0001 lb. per pound of oil passed through the system although this amount may vary from approximately 0.00008 to 0.005 lb. per pound of oil passing through the system. The steam introduced into the heater produces turbulence in the oil flowing therethrough and substantially prevents the formation of a quiescent film of oil in contact with the heating surfaces. In this connection, it is noted that in constructing the apparatus, it is essential to avoid pockets or traps in any portion of the system through which the heated oil flows, not only to enable the system to be thoroughly cleaned, but to prevent any portions of the oil being trapped and subjected to high temperatures for extended periods of time.

The heated oil leaving the last heater 21 will ordinarily have a temperature between 500° and 600° F. and preferably between 525° and 575° F. This oil is delivered directly into a deodorizing chamber 26 through a pipe 27. The preferred type of deodorizing chamber is shown in Figs. 2 and 3 and includes a horizontally extending cylindrical casing 28 provided with a plurality of vapor draw-off ducts 29. A pipe 30 extending along the lower portion of the chamber may be employed for introducing steam into the body of oil, in the casing 28, and a baffle 31, which preferably comprises a screen, is positioned somewhat below the axis of the casing. The heated oil enters the deodorizing chamber through the pipe 27 preferably just below the level of the oil in the chamber, this level being maintained a short distance below the surface of the screen 31 in the absence of steam entering through the pipe 30. The pipe 30 is preferably removable for cleaning and replacement and is provided with a plurality of small apertures 32 and preferably directed downwardly as illustrated in Fig. 3. Steam escaping from the apertures 32 passes upwardly through the shallow body of oil in the deodorizing chamber carrying the oil upwardly through the screen 31, as is discussed in more detail below. A baffle 33 suitably supported from the upper portion of the casing 28 may be provided adjacent each vapor duct 29 to assist in preventing entrainment of liquid oil and vapors being withdrawn from the vaporizing chamber. The casing 28 of the vaporizing chamber is preferably provided with a removable man-hole cover 34 and a removable closure member 35 is preferably provided to enable the screen 31 to be removed from the casing 28 for cleaning or replacement. The screen 31 is preferably provided with longitudinal stiffening members 36 along the sides thereof engaging in guides 37 which may be integral with or welded to the casing 28.

The thickness of the screen 31 as well as the size and spacing of the perforations therein has been greatly exaggerated in Figs. 2 and 3 for clarity of disclosure, but in general, the screen 31 will be made up of a thin plate of sheet metal having a large number of small holes therethrough, these holes in general ranging from 0.02″ to 0.08″ in diameter and occupying between 20% and 40% of the area of the screen. For most oils the diameter of the holes in the screen is preferably about 0.031″ and the holes occupy approximately 25% of the area of the screen. The apertures 32 in the pipe 27 are also small in diameter and are spaced along the length of the pipe. For example, these apertures may be approximately 0.031″ in diameter and spaced approximately 5″ apart although the diameter may vary between approximately 0.01″ and 0.05″ and the spacing may vary from approximately ¾″ to 10 inches.

Referring again to Fig. 1, the oil treated in the vaporizing chamber 26 overflows from this chamber through a pipe 38 connected to the lower portion of the chamber and also to an upper portion thereof to provide a vent to the space above the oil in the chamber. The pipe 38 is positioned at the desired level of the oil in the chamber, thus retaining the oil in the chamber at this level. The oil discharged from the deodorizing chamber 26 through the pipe 38 passes through a cooler 39 in indirect heat exchange with a suitable cooling medium and enters a steam treating chamber 41 through a pipe 27 which may be entirely similar to the pipe 27 supplying oil to the deodorizing chamber 26. The treated oil from the chamber 41 is discharged through a pipe 38 in the same manner as the oil is discharged from the deodorizing chamber 26. This oil is likewise cooled in a cooler 42 which may be similar to the cooler 39 and enters a second steam treatment chamber 43 through a pipe 27. The oil treated in the chamber 43 is discharged through a pipe 38, passed through another cooler 44 and enters a third steam treating chamber 46 through a pipe 27. The oil is discharged from the treating chamber 46 through a pipe 38, passed through a final cooler 47 and may be delivered into a storage tank 48 from which it may be withdrawn from the process by a pump 49. All of the deodorizing and steam treatment chambers 26, 41, 43 and 46 may be identical in construction and similar to the structure shown in Figs. 2 and 3, steam being introduced into each chamber through the pipe 27. A convenient manner of arranging the deodorizing and steam treating chambers is illustrated in Fig. 1 such that the oil flows by gravity through the various chambers and coolers.

The oil is maintained under a high vacuum in the deodorizing chamber 26, for example, at an absolute pressure between approximately ¾ and 3 mm. of mercury by withdrawing vapors from the deodorizing chamber through the vapor duct 29, and a vapor conduit 50. These vapors may be passed directly through a condenser 51 where the oil is brought into indirect heat exchange with a cooling medium such as water to condense any of the more easily condensable materials, such as fatty acids as well as certain sterols, etc. Any condensate may be collected in a receiving tank 52 which may be vented back to the vacuum through a line 53. The vapors including steam not condensed in the condenser 51 may be passed through a plurality of vacuum boosters such as 54 and 55 in series. Such vacuum boosters are well known in the art and include a Venturi passageway with a steam jet directing steam axially in the direction of vapor flow into the restricted portion of the Venturi passage. For example, the vacuum boosters 54 and 55 may increase the absolute pressure from approximately 1.5 mm. of mercury to approximately 35 mm. of mercury. The vapors from the vacuum booster 55 may be introduced directly into a condenser system preferably comprising a plurality of jet condensers such as condensers 56 and 57 in series. Any non-condensable gases may be removed from the condenser system by means of a plurality of vacuum boosters 58 and 59.

In general, it is not necessary to maintain the heating chamber 17 and steam treating chambers 41, 43 and 46 under as high a vacuum as the deodorizing chamber 26 and the vapors withdrawn from these chambers through the ducts 29 may be delivered to a vacuum manifold 60 connected through a duct 61 to a vacuum booster 62 which also discharges into the condenser 56. The absolute pressure in the steam treating chambers may thereby be maintained between approximately 2 mm. and 5 mm. of mercury, and preferably about 3 mm. The manifold vacuum 60 is preferably cooled by a cooling jacket 62' and any materials condensed therein may be collected in the receiving tank 63 vented back to the vacuum by a pipe 64. The constant level feed tank 11 may also be connected to the vacuum system through the pipe 65 and the storage tank 48 for receiving cooled and deodorized oil from the cooler 47 may likewise be connected to the vacuum system through a pipe 66 so that the oil is maintained under vacuum in the entire system from the feed tank 11 until it is discharged from the system.

The jet condensing system preferably is operated with a barometric head maintained by the pipe 67 although any other suitable arrangement for withdrawing condensed vapors along with the water used to condense the vapors, such as a pump and a constant level device, may be employed if desired.

The condensed material and cooling water may be delivered into a settling tank 68. The condensed materials including fatty acids and unsaponifiables such as tocopherols, sterols, etc., are all of less specific gravity than the water and collect on the upper surface of the settling tank. They may be withdrawn from the settling tank through a pipe 69 and the water withdrawn through a pipe 70. The condensed materials from the receiving tanks 52 and 63 may be withdrawn therefrom by means of a pump 71 and either discharged from the process through the pipe 72 or into the settling tank 68 through the pipe 73. By manipulation of the various valves shown, the pump 71 may be, from time to time, employed to discharge the material from either the receiving tanks 52 or 63 individually from the process or to the settling tank 68. In the latter case, all of the condensed material is discharged together from the process through the pipe 69.

A modified form of vaporizing chamber is shown in Fig. 5 which is particularly suitable for employment as the heating chamber of Fig. 1. This chamber is the same as that shown in Figs. 2 and 3 except that a plurality of heat exchanger pipes 74 may be positioned in the lower portion thereof so as to be below the level of the oil. The heat exchanger pipes 74 may be provided with a plurality of annular fins 76 as shown most clearly in Fig. 6. Otherwise the structure of the vaporizing chamber of Figs. 5 and 6 may be the same as that of Figs. 2 and 3, and the same reference numerals have been applied to equivalent elements. The vaporizing chamber structure shown in Fig. 5 may thus be employed to heat the oil as well as for steam treating the oil under vacuum conditions and in addition to its use as a heating chamber 17 may also be employed as the deodorizing chamber 26 since the heat exchanger tubes 74 in the lower portion thereof may be employed to prevent a drop in temperature of the oil in the deodorizing chamber or even to somewhat increase the temperature of the oil therein.

The oil being deodorized in accordance with the present process is subjected to high temperature-high vacuum treatment in the deodorizing chamber 26 while being intimately contacted with steam. The steam introduced into the deodorizing chamber through the pipe 27 carries the oil from the shallow bath in the chamber upwardly through the apertures in the central portion of the screen 31. That is to say, bubbles of steam rising through the oil are broken into smaller bubbles in passing through the apertures in the screen and a layer of foam, made up of fine bubbles having small amounts of steam and vapors surrounded by a thin film of oil, collects on the upper surface of the screen. This foam flows outwardly from the central portion of the screen toward the sides of the chamber and the bubbles constantly break to release oil, which oil flows downwardly through the apertures in the screen adjacent the side edges thereof. The thin film of oil forming the bubble walls is therefore brought into intimate contact with the steam to assist in releasing vapors of vaporizable materials from the oil and a lateral circulation is set up in the vaporizing chamber whereby the oil is repeatedly carried upwardly through the apertures in the screen by the steam and returned through the edge portions of the screen. The oil gradually progresses from the inlet end of the deodorizing chamber to the discharge end while being repeatedly treated with steam. The vapors released from the oil into the steam are constantly withdrawn from the deodorizing chamber. The layer of foam on top of the screen remains relatively quiescent since the screen prevents violent surging and splashing of the oil in the shallow bath of oil in the chamber. The screen thus performs both a mixing operation between the oil and steam and a separating operation above the screen after the steam has been thoroughly mixed with the oil. Entrainment of oil in the vapors withdrawn from the chamber is largely eliminated, the baffles 33 of Figs. 2 and 3 also assisting in eliminating entrainment of oil since the vapors must make abrupt changes in direction flowing past the baffles 33 into the vapor ducts 29. A similar action takes place in the heating chamber 17 and the steam treating chambers 41, 43 and 46, the treatment in the latter chamber being at progressively lower temperatures, as discussed below.

As stated above, the most critical portion of the heating system appears to be the initial heating of the oil from ambient temperature up to temperatures in the neighborhood of 400° F., i. e., to a temperature of 350° to 450° F. In even the best type of heaters for heating a stream of oil by indirect heat exchange, such as the finned tube heater of Fig. 4 with large heating surfaces at a small temperature differential with respect to the oil, films of oil and deposits on the heating surfaces result in burning or scorching of films of oil or deposits unless the heaters are frequently taken out of service and cleaned. By heating a body of oil in contact with heated surfaces while vigorously agitating the oil with steam, for example, in a heating chamber such as shown in Fig. 5, these difficulties can be overcome. The oil is maintained in constant circulation in paths extending laterally of the heating chamber by distributing steam into the lower portion of the chamber through the perforated pipe 39. The oil is carried upwardly past the finned heating tubes 74 in the central portion of the chamber and downwardly and inwardly past the finned heating tubes adjacent the side portions of the chamber. The steam and rapid circulation of the oil prevent any stationary films or deposits from remaining on the heating surfaces.

The oil being heated also gradually moves axially of the heating chamber from the inlet to the outlet thereof and by flowing the heating medium countercurrent to the flow of oil through the chamber, rapid and effective heating of the oil is accomplished. The amount of steam passed through the oil need be only that necessary to produce effective agitation of the oil and may, for example, be from 0.005 to 0.015 lb. per pound of oil treated, the usual amount being approximately 0.01 lb.

The heating chamber is also preferably maintained under vacuum conditions. The vacuum removes any air not removed in the feed tank 11 and also a considerable amount of volatile material is vaporized and removed. This reduces the vaporizing load on the deodorizing chamber 26 and also removes vaporizable, heat-sensitive materials which may be present before the higher temperatures contemplated in the present process are reached. After the initial heating step just described, the oil leaving the heating chamber 17 may then be passed through the heaters 19, 20 and 21 without difficulty since the viscosity of the oil is sufficiently low to eliminate formation of stationary films. Care should, however, be exercised to prevent local overheating of the oil, for example, by employing heat exchangers of the type shown in Fig. 4 and maintaining a low differential between the temperature of the heating medium and the oil in any portion of the heat exchangers. For example, such temperature differential should not be greater than about 100° F. in the heaters 19 and 20 and not greater than about 50° F. in the heater 21. It will be understood that heat exchangers similar to the heat exchangers 19, 20 and 21 may be employed for the initial heating of the oil instead of the heating chamber 17 if such heat exchangers are frequently cleaned.

When an edible glyceride oil of the type above discussed is heated to temperatures between 500° and 600° F. a small amount of cracking or other modification of the oil takes place which produces vaporizable materials imparting a disagreeable flavor to the oil. This flavor is rubbery in nature and may be called a "cooked" odor and taste. So long as the oil remains in the deodorizing chamber under high vacuum and in intimate contact with steam, these disagreeable flavor producing materials are withdrawn as fast as they are produced. However, any attempt to cool the oil in the absence of steam results in the "cooked" flavor referred to above, this flavor appearing even if the oil from the deodorizing chamber 26 is immediately passed through a cooler. That is to say, even the short length of time in which the oil is flowing in pipes to or through the initial portion of the cooler results in the appearance of a disagreeable odor and taste. It has been found that by cooling the oil in the presence of steam and under a high vacuum, that the flavor producing materials can be removed. It is entirely possible to cool the oil while treating it with steam continuously, for example, in vaporizing chambers of the type shown in Figs. 5 and 6, in which a cooling medium is passed through the cooling tubes 74 but more rapid cooling and equivalent results may be obtained by passing the oil alternately through a plurality of coolers and steam treating chambers such as coolers 39, 42 and 44 and steam treating chambers 41, 43 and 46.

If the oil in the cooler 39 is not cooled substantially below 400° F. a steam treatment at this temperature will effectively remove the cooked flavor which appears in the cooler 39 and associated pipes. Some of the cooked flavor of the treated oil will again appear in the cooler 42 at a temperature of around 400° F. and the oil may be again treated in a steam treating chamber 43 at a temperature preferably just slightly below 400° F., after which the oil may be again cooled in a cooler 44 to a temperature in the neighborhood of 325° to 350° F., and again steam treated at approximately this temperature. A small amount of cooked flavor will even occur in the cooler 44 but this flavor is removed in the steam treating chamber 46. The oil removed from the chamber 46, which may have a temperature below 350° F., may thereafter be cooled in the cooler 47 to any desired lower temperature, for example, a temperature of 90° F. without any further appearance of the cooked flavor. As stated above, the vacuum in the steam treating chambers 41, 43 and 46 need not be as high as that in the deodorizing chamber but the absolute pressure in such steam treatment chambers is preferably not higher than 5 mm. of mercury absolute.

The preferred operation of the present invention thus involves heating the oil in a body of oil under vacuum while being vigorously agitated with steam to a temperature between 350° and 450° F., and preferably about 435° F., further heating the oil to a temperature between approximately 500° and 600° F. and preferably about 545° F., then steam treating the oil at such temperature in a shallow bath having a baffle arrangement to both mix and separate the oil and steam above the bath, while the oil is under an absolute pressure of ¾ to 3 mm. of mercury and preferably about 1.5 mm. to deodorize the oil, the deodorizing treatment being followed by similar steam treatments of the oil at progressively lower temperatures beginning at least as high as 400° F. and ending at least as low as 350° F. and preferably 325° F. The absolute pressure in the initial heating operation and in the steam treating operations after the deodorizing step is preferably less than about 5 mm. and preferably about 3 mm. of mercury. The amount of steam passed through the deodorizing step may range between approximately 0.01 and 0.35 lb. per pound of oil, preferably about 0.02 lb. and the amount of steam passed through the oil in the initial heating step and also in each treating step following the deodorizing step being between approximately 0.01 and 0.02 lb. per pound of oil, and preferably about 0.15 lb. Thus the total amount of steam employed for contacting the oil may range between approximately 0.05 and 0.12 lb. per pound of oil. The time of treatment in each of the heating, deodorizing and subsequent steam treating steps may range between 15 and 30 minutes, preferably about 20 minutes and the time in each of the heaters 19, 20 and 21 as well as the coolers 39, 42 and 44 will average from 4 to 6 minutes. The total time the oil is above 400° F. will therefore be approximately 45 minutes to 1½ hours. The size of the chambers for heating, deodorizing and subsequent heat treating may vary, depending upon the throughput desired but may hold, for example, between approximately 1,000 and 3,000 lbs. of oil with oil depths therein ranging between approximately 10 and 20 inches, the height of the screen or baffle above the normal level of the oil preferably ranging between approximately 1 and 2½ inches although the screen may be at approximately the normal level of the oil or even slightly below.

As a specific example of a deodorizing operation on soya bean oil in accordance with the present invention, the oil entering the heating chamber 17 may be a refined and decolorized soya bean oil at ambient or moderately elevated temperatures. It may be heated in the heating chamber 17 to approximately 435° F. in approximately 20 minutes while under an absolute pressure of 3 mm. of mercury and while approximately 0.015 lb. of steam per pound of oil is passed through the oil. The oil may then be heated in the heater 19 from approximately 435° to approximately 460° F. in approximately 5 minutes. It may then be heated in the heater 20 from approximately 460° F. to 500° F., again in approximately 5 minutes, and in the heater 21 from approximately 500° to 545° F. in approximately 5 minutes. The oil may be passed through the deodorizing chamber 26 in approximately 20 minutes while being treated with steam, as above described, under an absolute pressure of approximately 1.5 mm. of mercury. The amount of steam introduced into the deodorizing chamber may be approximately 0.015 lb. per pound of oil treated. This steam may be superheated steam having a temperature approximately that of the oil in the treating chamber, but with the small amount of steam employed, it has been found that steam at a considerably lower temperature than the temperature of the oil may be employed. For example, steam having a temperature of 350° F., under a pressure of 120 lbs. per square inch is entirely suitable. The steam introduced should, however, preferably have at least a small amount of superheat in order to avoid any possibility of small droplets of water being introduced with the steam. Such droplets of water tend to produce small explosions interfering with the proper operation of the apparatus. When employing a vaporizing chamber of the type shown in Figs. 2 and 3, the temperature will drop somewhat in the deodorizing chamber, for example, from approximately 545° F. to approximately 530° F., but if a deodorizing chamber similar to that shown in Figs. 5 and 6 is employed, the temperature entering the deodorizing chamber may be as low as 540° F., and this temperature may be maintained throughout the chamber.

Upon being withdrawn from the deodorizing chamber 26, the oil may be cooled in the cooler 39 to approximately 415° F. and subjected to steam treatment in the treating chamber 41 for approximately 20 minutes. It may be withdrawn from the steam treating chamber at a temperature of approximately 405° F. and cooled to a temperature of approximately 400° F. in the cooler 42 and then subjected to steam treatment in the treating chamber 43, again for approximately 20 minutes. It may be withdrawn from the chamber 43 at a temperature of approximately 390° F., and cooled to approximately 325° F. in the cooler 44 and again treated with steam in the chamber 46, being withdrawn therefrom at a temperature of approximately 310° F. It may then be cooled in the cooler 47 to a temperature of approximately 90° F. The vacuum maintained in the cooling chambers may be approximately 3 mm. of mercury absolute and the amount of steam introduced into each of the cooling chambers may be approximately 0.015 lb. per pound of oil treated. Thus the total amount of steam used to contact the oil in the deodorizing chamber and steam treating chamber may be approximately 0.065 lb. per pound of oil treated. Also, the amount of steam passed through the oil in the heating chamber 17 may be 0.01 lb. per pound of oil giving a total of 0.08 lb. per pound of oil employed to treat the oil in the process. Each of the chambers 17, 26, 41, 43 and 46 may hold 2500 lbs. of oil with an oil depth therein of 11 inches to give a throughput of 7500 lbs. of oil per hour.

The oil withdrawn from the process, even in the case of soya bean or other reverting oils, is a high quality oil having a bland flavor and being substantially free from any tendency to revert even at cooking temperatures. The present process also removes or modifies the materials found in most edible glyceride oils which cause reversion after hydrogenation. It is well known that edible glyceride oils, in general, when subjected to a hydrogenation treatment develop a hydrogenated flavor which has been likened to the odor of a snuffed tallow candle. Such flavor can be removed from the hydrogenated oil by a conventional deodorizing treatment, for example, in the batch treatment of the prior art, but many hydrogenated oils develop an off flavor after such deodorizing treatment. Deodorization of oil in accordance with the present invention employing high temperatures and low vacuum with intense treatment with steam as well as a proper cooling procedure results in an oil which does not revert after hydrogenation. In other words, the oil discharged from the present process may be hydrogenated and the hydrogenation flavor above discussed will be developed therein. However, by subjecting such oils to a subsequent mild deodorizing treatment or even the batch treatment of the prior art, a bland oil is produced which does not revert. The oil from the high temperature deodorizing step may also be quickly cooled to a hydrogenation temperature, hydrogenated, then heated to a temperature of 400° to 430° F. and run through the cooling procedure with steam treatment in accordance with the present invention to provide a bland, non-reverting oil.

The high temperatures and low pressures of the present invention, in conjunction with the intimate contact with steam, discussed at length above, results in the removal of a substantial amount of vaporizable materials from the oil. This material is condensed and recovered from the process and constitutes a valuable by-product. Thus, in the case of soya bean oil, it contains a substantial amount of tocopherol as well as substantial amounts of various sterols. The unsaponifiable content of a refined, decolorized soya bean oil will usually be in the neighborhood of 0.7% to 0.8%, the tocopherol content being approximately 0.15%. Prior deodorizing processes have reduced the unsaponifiable content to approximately 0.6% without substantial reduction of the tocopherol content, whereas the present process reduces the unsaponifiable content to 0.4% or 0.5% and the tocopherol content to 0.04% or less, even in some instances down to 0.01%. The tocopherol content of the final soya bean oil is an index of the resistance of the oil to reversion. It is not definitely known that the tocopherol content of a deodorized oil causes reversion, but it is apparent that the conditions in the present process effecting substantially complete removal of tocopherols also cause substantially complete removal or modification of the substances producing reversion.

Another index of the resistance of the oil to reversion is the so-called E-value or specific absorption coefficient determined by the Beckmann spectrophotometer. The E-value at any given wave length is the logarithm of the ratio of the intensity of the radiation transmitted through a column of suitable solvent 1 cm. long to the intensity of radiation transmitted through the same length column of a one percent solution of the oil in the solvent. It is accepted that a definite peak or maximum at approximately 234 mu indicates conjugation of two double bond fatty acids, i. e., diene conjugation. Similarly, a definite peak or maximum at approximately 268 mu is accepted as indicating a conjugation of three double bond fatty acids, i. e., triene conjugation. The E-value at 234 mu increases with time and temperature of treatment of the oil. Thus for soya bean oil, tests indicate that a process involving time and temperatures which approach an E-value at 234 mu which is not greater than about 10 will yield a satisfactory, non-reverting oil for use as an unhardened oil. If the oil is to be subsequently hardened, i. e., hydrogenated, it is possible and in some instances desirable to continue treatment for a sufficient period of time at a sufficiently high temperature to increase the 234 mu E-value to a maximum of approximately 11.5. It is to be understood, however, that the mere increase of the E-values of a glyceride oil within the ranges stated above does not, of itself, produce a desirable product. It is only when the unsaponifiable content is reduced to approximately half of the original content while still maintaining an E-value within the range above-discussed, for example, by a process similar to that of the present invention, that a stable, non-reverting oil is produced. In the case of a soya bean oil, the tocopherol content must likewise be reduced to 0.04% or less.

In addition to producing an improved finished oil substantially free from odor and taste bodies and other volatile materials, the volatile materials removed from the oil are recovered from the process and condensed as a valuable concentrate. This concentrate contains sterols and various fat-soluble vitamins, depending upon the oil being treated, which may be separately recovered from the concentrate by known procedures such as molecular distillation or solvent treatment. The unsaponifiable concentrates recovered from the process of the present invention without further purification except for the removal of water, will contain approximately 25% to 50% unsaponifiables including approximately 6 to 10% tocopherols in the case of a soya bean oil. The concentrate may also contain a substantial amount of fat-soluble vitamins such as A and D, depending upon the oil being treated. Several hundred pounds of concentrate are recovered from each tank car of oil treated and the value of the distillate fraction recovered constitutes one of the important advantages of the process. That is to say, under certain conditions the process can be operated at a substantial profit based on the sale of the distillate fraction alone aside from the fact that an improved oil is produced. For this reason, among others, the high temperature process of the present invention is applicable to non-conjugated glyceride oils in general, even though the oil can be satisfactorily deodorized by prior processes. Substantially all of the glyceride oils contain sterols including fish oil and fish liver oils which, in general, contain cholesterol. Even in the case of paint and drying oils, the value of the distillate fraction makes treatment of these oils by the present process profitable and in addition, the quality of the oil is improved. For example, the process of the present invention removes the substances which cause yellowing in light colored enamels in which the treated oil is employed as a vehicle. Also, such oils as wool-grease containing a high percentage of cholesterol can be profitably treated by the present process for the purpose of recovering sterols and other unsaponifiables. The process may then become primarily a process for the recovery of unsaponifiables from non-conjugated glyceride oils without damage to the oils or to the unsaponifiables.

A typical example of the total distillate fraction from a tank car of soya bean oil is as follows:

| | |
|---|---|
| Total distillate per car _____lbs__ | 500 |
| Acid No. _____ | 40 |
| Total unsaponifiables_____per cent__ | 25–30 |
| Tocopherols _____do____ | 8 |
| Fatty acids_____do____ | 20 |
| Neutral oil_____do____ | 39–44 |
| Moisture _____do____ | 3 |

This application is a continuation-in-part of my copending application, Serial No. 57,114, filed October 28, 1948, which is a continuation-inpart of my copending application Serial No. 744,846, filed April 30, 1947, which in turn is a continuation-in-part of my copending application Serial No. 533,744, filed September 12, 1944.

I claim:

1. A process for deodorizing a glyceride oil to produce an edible oil, which comprises, the steps of subjecting said oil in small quantities to a heating treatment to heat said oil to a temperature sufficiently high that an extended time of treatment at said temperature will impair the edible qualities of said oil, subjecting the heated oil in small quantities to a distillation treatment at said temperature, including passing steam upwardly through said oil and withdrawing steam and vapors from above said oil at a rate sufficient to maintain said oil under vacuum conditions, restricting the time of treatment of said oil at said temperature to such a brief period as to prevent impairment of the edible properties of said oil, subjecting the resulting oil in small quantities to a cooling treatment at progressively lower temperatures to cool said oil to a lower temperature substantially below said first-mentioned temperature, and continuing to pass steam through said oil and withdrawing vapors and steam from above said oil during said cooling treatment to maintain said vacuum conditions, the time during which said oil is subjected to said cooling treatment being longer than the time said oil is subjected to said heating treatment and longer than the time said oil is subjected to said distillation treatment.

2. The process as defined in claim 1 in which said cooling treatment is carried out successively in a plurality of stages at said progressively lower temperatures.

3. The process as defined in claim 1 in which the oil in at least the initial portion of said heating treatment is heated while the oil is under vacuum conditions and while steam is passed upwardly through said oil.

4. The process as defined in claim 1 in which the oil is soya bean oil and the temperature in said distillation treatment is between 500 and 600° F.

5. A process for deodorizing a glyceride oil to produce an edible oil, which comprises, the steps of subjecting said oil in small quantities to a heating treatment to heat said oil to a temperature between 500 and 600° F., subjecting the heated oil in small quantities to a distillation treatment at said temperature, including passing steam upwardly through said oil and withdrawing steam and vapors from above said oil at a rate sufficient to maintain said oil under vacuum conditions, restricting the time of treatment of said oil at said temperature to such a brief period as to prevent impairment of the edible properties of said oil, subjecting the resulting oil in small quantities to a cooling treatment in a plurality of stages at progressively lower temperatures to cool said oil to a lower temperature substantially below said first-mentioned temperature, and continuing to pass steam through said oil and withdrawing vapors and steam from above said oil during said cooling treatment to maintain said vacuum conditions, the time during which said oil is subjected to said cooling treatment being longer than the time said oil is subjected to said heating treatment and longer than the time said oil is subjected to said distillation treament.

6. The process as defined in claim 5, in which the oil is soya bean oil and a substantially non-reverting deodorized soya bean oil is produced.

7. The process as defined in claim 5, in which the oil in at least the initial portion of said heating treatment is heated while steam is passed upwardly through said oil and the oil is under vacuum conditions.

BENJAMIN H. THURMAN.

REFERENCES CITED

The following references are of record in the file of this patent:

UNITED STATES PATENTS

| Number | Name | Date |
|---|---|---|
| 53,062 | Weyde | Mar. 6, 1866 |
| 1,498,389 | La Bour | June 17, 1924 |
| 1,754,598 | Bollmann | Apr. 15, 1930 |
| 2,078,841 | Fauth | Apr. 27, 1937 |
| 2,280,896 | Dean | Apr. 8, 1942 |
| 2,327,766 | Cawley | Aug. 24, 1943 |
| 2,351,832 | Neal | June 20, 1944 |
| 2,368,669 | Lee et al. | Feb. 6, 1945 |
| 2,422,185 | Dean | June 17, 1947 |
| 2,450,612 | Potts | Oct. 5, 1948 |
| 2,451,332 | Green | Oct. 12, 1948 |

FOREIGN PATENTS

| Number | Country | Date |
|---|---|---|
| 242,316 | Great Britain | Nov. 9, 1925 |
| 277,085 | Great Britain | Sept. 7, 1927 |